(12) United States Patent
Maier et al.

(10) Patent No.: US 9,428,014 B2
(45) Date of Patent: Aug. 30, 2016

(54) TIRE PRESSURE MONITORING SYSTEM

(75) Inventors: Uli Maier, Brackenheim-Hausen (DE); Mark Braun, Bretten-Gölshausen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 868 days.

(21) Appl. No.: 12/383,702

(22) Filed: Mar. 26, 2009

(65) Prior Publication Data

US 2009/0251305 A1    Oct. 8, 2009

(30) Foreign Application Priority Data

Apr. 4, 2008    (DE) .......................... 10 2008 017 982

(51) Int. Cl.
 *B60C 23/00* (2006.01)
 *B60C 23/04* (2006.01)

(52) U.S. Cl.
 CPC ................................ *B60C 23/0408* (2013.01)

(58) Field of Classification Search
 CPC .................................................. B60C 23/0408
 USPC ............... 340/438, 442; 73/146, 146.2, 146.3
 See application file for complete search history.

(56) References Cited

U.S. PATENT DOCUMENTS

| | | | |
|---|---|---|---|
| 4,567,459 A | 1/1986 | Folger et al. | |
| 5,602,524 A | 2/1997 | Mock et al. | |
| 5,768,162 A * | 6/1998 | Rupp et al. | 702/186 |
| 6,018,993 A | 2/2000 | Normann et al. | |
| 6,181,241 B1 | 1/2001 | Normann et al. | |
| 6,194,999 B1 | 2/2001 | Uhl et al. | |
| 6,362,731 B1 | 3/2002 | Lill | |
| 6,580,365 B2 | 6/2003 | Starkey | |
| 6,591,671 B2 | 7/2003 | Brown | |
| 6,794,993 B1 | 9/2004 | Kessler et al. | |
| 7,917,270 B2 * | 3/2011 | Katrak et al. | 701/70 |
| 2002/0075145 A1 * | 6/2002 | Hardman et al. | 340/442 |
| 2002/0095253 A1 * | 7/2002 | Losey et al. | 701/71 |
| 2004/0055370 A1 | 3/2004 | Normann et al. | |
| 2005/0110623 A1 | 5/2005 | Schulze et al. | |
| 2007/0068240 A1 | 3/2007 | Watabe | |
| 2007/0252685 A1 | 11/2007 | Oda et al. | |
| 2009/0021363 A1 | 1/2009 | Heise et al. | |

FOREIGN PATENT DOCUMENTS

DE    10 2006 012 535 A1    10/2006

* cited by examiner

*Primary Examiner* — Kerri McNally
(74) *Attorney, Agent, or Firm* — Hackler Daghighian & Martino

(57) ABSTRACT

The invention relates to a tire pressure monitoring system with a wheel electronic to be installed in a pneumatic tire, comprising a battery as power source, a pressure sensor for measuring of tire pressure or pressure change, and a transmitter for transmitting pressure data, a receiver to be mounted either in or at the vehicle for receiving pressure data, a control unit for evaluating of pressure data, and a serial bus system via which, during operation, the control unit interrogates the receiver and receives subsequently pressure data from the receiver. In accordance with the invention it is provided that additionally to the serial bus system the receiver is also connected with the control unit via a data transfer line that is separate from the serial bus system, wherein the receiver notifies the control unit of critical pressure data via the data transfer line in an unrequested manner.

7 Claims, 1 Drawing Sheet

TIRE PRESSURE MONITORING SYSTEM

The invention relates to a tire pressure monitoring system for pneumatic tires.

Such a tire pressure monitoring system comprises wheel electronics that must be installed in the pneumatic tires of a vehicle. The wheel electronic comprises a pressure sensor for measuring tire pressure or pressure change and a transmitter for sending pressure data. The pressure data are received by a receiver or receivers of the tire pressure monitoring system mounted in or on the vehicle and processed by a control unit. The receiver(s) is (are) connected to the control unit via a serial bus system by means of which, upon request, the control unit receives pressure data from the receiver.

On the one hand, in a pneumatic tire of a vehicle can occur a slow, creeping pressure drop so that the speed with which the actual pressure data can be gathered by the control unit is to a great extent non-critical. On the other hand, in a pneumatic tire can also occur a rapid pressure drop caused, e.g., by the blowout of a tire. Such critical pressure data should be made available to the control unit as quickly as possible.

The object of the invention is therefore to disclose a manner in which critical pressure data can be made available to the control unit as quickly as possible.

SUMMARY OF THE INVENTION

This object is attained by a tire pressure monitoring system with the features set forth in claim 1. Advantageous embodiments of the invention are object of dependent claims.

In a tire pressure monitoring system according to the invention the receiver is connected not only via the serial bus system to the control unit but additionally also by a data transfer line that is separate from the serial bus system. Via this data transfer line, the receiver signals critical pressure data to the control unit in an unrequested manner.

Via a serial bus system, the receiver can send data to the control unit only upon request of the control unit. Thus, upon receiving critical pressure data, considerable time can pass until the receiver is interrogated anew by the control unit and therefore receives authorization to transfer data via the bus system to the control unit. By means of a data transfer line, separate from the serial bus system, between the receiver and the control unit it is possible to avoid this waiting period so that critical pressure data can be immediately conveyed by the receiver to the control unit. In a tire pressure monitoring system according to the invention critical pressure data can be advantageously made available very quickly, e.g., within a few milliseconds.

Since a critical pressure drop occurs only very seldom, it is possible to use in regular operation of a pressure monitoring system according to the invention the advantages of the bus system, namely a controlled communication between the receiver and the control unit. The data transfer line that is separate from the bus system, is used only rarely in exceptional circumstances, namely when the wheel electronic transmits critical pressure data.

Preferably, the control unit is provided with a connection for a vehicle bus for the output of processed pressure data. In such a manner, via a vehicle bus, processing results can be provided by the control unit to one or several vehicle safety systems, e.g., an electronic stability control and/or an anti-lock braking system. In the case of a critical condition, such as a blowout of a tire, such systems can intervene very rapidly and defuse or prevent dangerous situations, e.g., a skidding of the vehicle.

An advantageous embodiment provides that the wheel electronic comprises an evaluation unit that, during operation, determines from signals of the pressure sensor the pressure data and decides according to stored criteria whether the gathered pressure data is critical. A critical threshold for a pressure drop in a predefined time interval, e.g., from the previous measuring, may be selected as a criteria. Should the critical threshold be surpassed, the available pressure data is critical and indicates, e.g., a blowout of the pneumatic tire. Preferably, when determining critical pressure data, the evaluation unit increases the rate of the transmissions with which pressure data is sent. The receiver can recognize critical pressure data by the increased transmission rate. However, it is also possible that the wheel electronic transmits critical pressure data with a particular identifier by means of which the receiver recognizes that the received pressure data is to be transmitted via the data transfer line to the control unit in an unrequested manner.

Preferably, pressure data are sent by the wheel electronic as part of a data telegram. In addition to the actual pressure data, such a data telegram can additionally contain a bit or a bit string in order to designate the pressure data as critical. Such a data telegram can additionally contain a characteristic identifier by means of which the control unit can assign the pressure data to the pertinent pneumatic tire of the vehicle.

BRIEF DESCRIPTION OF THE DRAWINGS

Further details and advantages of the invention are explained from an embodiment making reference to the accompanying illustrations, wherein.

DETAILED DESCRIPTION

Figure 1:
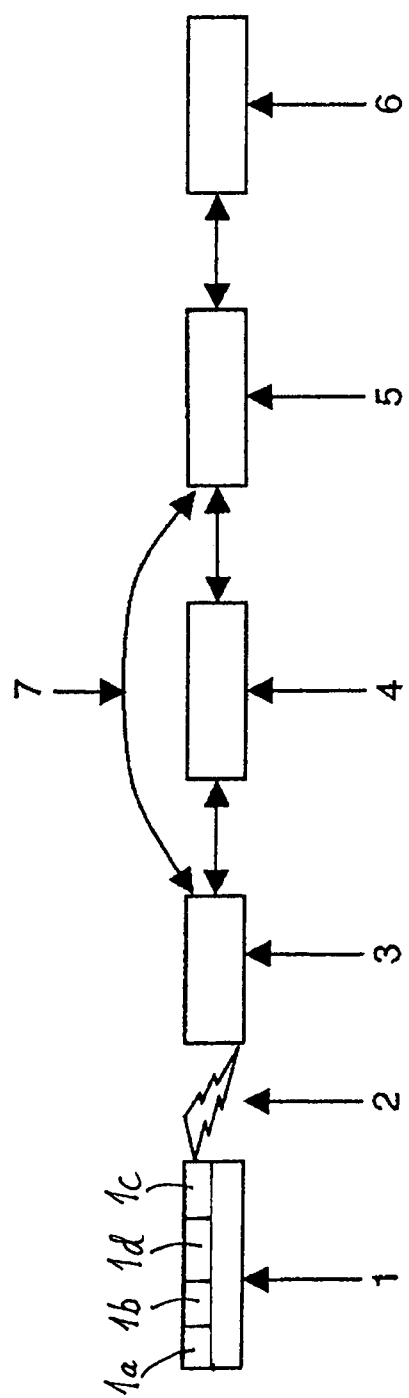
FIG. 1 shows a diagrammatical representation of an embodiment of a tire pressure system according to the invention.

Fire 1 shows diagrammatically a tire pressure monitoring system with a wheel electronic which is mounted in a pneumatic tire of a vehicle and comprises a battery 1$a$ as power source, a pressure sensor 1$b$ for measuring tire pressure or a pressure change, and a transmitter 1$c$ for sending pressure data. The pressure data are transmitted by wireless communication via a radio link 2 to a receiver 3 installed either in or at the vehicle. In the illustrated embodiment, the tire pressure monitoring system has only one central receiver 3 that receives the signals from the wheel electronics in all pneumatic tires of the vehicle. By way of example, it is however also possible that a separate receiver 3 is assigned to each axle or even to each pneumatic tire of the vehicle.

The receiver 3 is connected via a serial bus system 4, preferably a master-slave bus system, to a control unit 5 that evaluates the pressure data. By means of the master-slave bus system 4 the control unit interrogates the receiver 3. As response to an interrogation, the receiver 3 transmits received pressure data via the master-slave bus systems 4 to the control unit 5.

The receiver 3 is additionally connected to the control unit 5 by a data transfer line 7 that is separate from the bus system 4. By means of the data transfer line 7 the receiver 3 transmits critical pressure data to the control unit 5 in an unrequested manner. Thus, it is possible to provide critical pressure data much faster to the control unit 5 such as, e.g., a rapid pressure drop as it occurs in the case of a blowout of a tire. In the case of a transmission exclusively by a master-slave bus system some time can elapse between the reception of the critical pressure data by the receiver 3 and the next interrogation by the receiver 3, namely the next transmission via the bus system. This waiting period is omitted in an unrequested transmission of critical pressure data via the separate data transfer line 7.

Because of the data transfer line 7, it is possible for the control unit 5 to evaluate critical pressure data at an early stage and make the evaluation results available to one or several vehicle safety systems via a vehicle bus 6 such as, e.g., a CAN bus. By way of example, an electronic stability control system can control an antilocking system of the vehicle by using the evaluation results of the critical pressure data provided by the control unit 5 via the vehicle bus 6 in order to prevent a skidding of the vehicle. Insofar as data on a critical pressure drop are available on the vehicle bus 6 within a few milliseconds it is possible to prevent or defuse dangerous situations.

The wheel electronic is provided with an evaluation unit 1d that, during operation, gathers from the signals of the pressure sensor 1a the pressure data to be sent and, according to stored criteria, decides whether the gathered pressure data is critical. By way of example, the stored criteria can preset a critical threshold value for a pressure drop within a defined period of time.

Should the evaluation unit 1d of the wheel electronic 1 detect critical pressure data, the transmission rate, by which pressure data is transmitted, is increased. In principle, the receiver 3 can recognize critical pressure data from the increased transmission rate. In the herein illustrated embodiment, however, the wheel electronic 1 sends critical pressure data with a special identifier by which the receiver 3 recognizes that the received pressure data is critical and that, therefore, it must be transmitted by the data transfer line 7.

The pressure data is transmitted as a data telegram that, in addition to the pressure data, contains a bit or a bit string as identifier, by which the receiver 3 recognizes whether the pressure data is critical. Additionally, the data telegram can contain a characteristic identifier by means of which the control unit 5 can recognize to which pneumatic tire of the vehicle pertains the pressure data.

Figure 2:
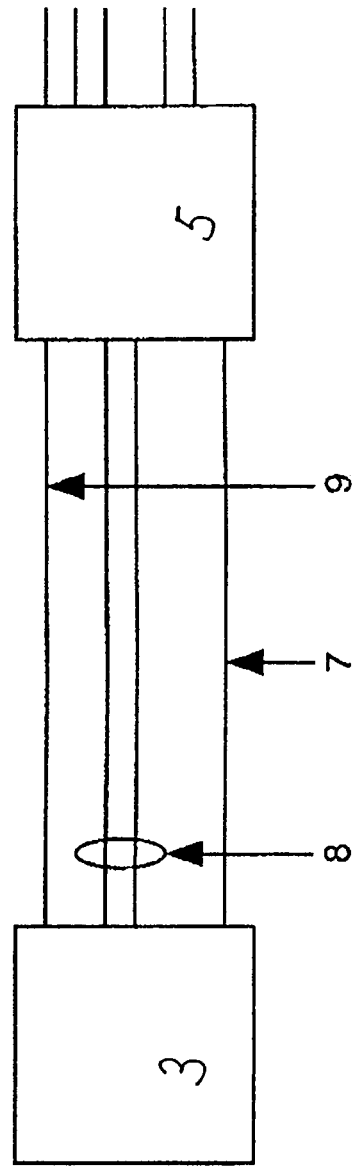
FIG. 2 shows connections between receiver and control unit.

FIG. 2 shows diagrammatically the connections between the control unit 5 and the receiver 3. The receiver 3 and the control unit 5 are connected by the data transfer lines 9 of the master-slave bus system 4 as well as by lines 8 for power supply of the receiver 3. Additionally, the receiver 3 is connected by the separate data transfer line 7 by means of which it sends in an unrequested manner critical pressure data to the control unit 5.

REFERENCE NUMBERS

1. Wheel electronic
1a. Battery
1b. Pressure sensor
1c. Transmitter
1d. Evaluation unit
2. Radio link
3. Receiver
4. Serial bus system
5. Control unit
6. Vehicle bus
7. Data transfer line
8. Lines for power supply
9. Data transfer lines

What is claimed is:

1. A tire pressure monitoring system comprising:
a wheel electronic installable in a pneumatic tire, the wheel electronic comprising a battery as power source, a pressure sensor for measuring of tire pressure or pressure change, and a transmitter for transmitting non-critical pressure data and critical pressure data, wherein the critical pressure data is a rapid pressure drop indicating a blowout of the pneumatic tire;
a receiver for receiving the non-critical pressure data and the critical pressure data;
a control unit for evaluating the non-critical pressure data and the critical pressure data;
a serial bus system interconnecting the control unit and the receiver for enabling the control unit to interrogate the receiver and receive the non-critical pressure data from the receiver, wherein the serial bus system is a master-slave bus system; and
a data transfer line, separate from the serial bus system, for connecting the receiver with the control unit, the receiver being configured for sending to the control unit the critical pressure data via the data transfer line in an unrequested manner;
wherein the receiver, the control unit, the serial bus system and the data transfer line are mounted either in or at a vehicle of the pneumatic tire;
wherein the wheel electronic comprises an evaluation unit for gathering, from signals of the pressure sensor, the non-critical pressure data and the critical pressure data to be transmitted, the evaluation unit determining according to a stored criteria whether the data is non-critical pressure data or critical pressure data, the evaluation unit including a special identifier associated only with the critical pressure data, wherein the special identifier comprises a bit or a bit string;
wherein the wheel electronic transmits the critical pressure data with the special identifier, enabling the receiver to recognize that the critical pressure data is to be sent by the data transfer line;
wherein via the serial bus system the receiver sends the non-critical pressure data to the control unit only upon request of the control unit, and wherein via the data transfer line the receiver sends the critical pressure data within a few milliseconds to the control unit only upon recognizing the special identifier.

2. The tire pressure monitoring system according to claim 1, wherein the evaluation unit, when detecting the critical pressure data, increases the transmission rate at which the pressure data are sent.

3. The tire pressure monitoring system according to claim 1, wherein the receiver is a central receiver for receiving the non-critical pressure data and the critical pressure data from several wheel electronics.

4. The tire pressure monitoring system according to claim 1, further comprising a vehicle bus and the control unit includes a connector for outputting processed pressure data to the vehicle bus.

5. The tire pressure monitoring system according to claim 4, wherein the control unit provides a vehicle safety system with information regarding a critical pressure drop via the vehicle bus.

6. The tire pressure monitoring system according to claim 5, wherein an anti-lock braking system of the vehicle is controlled with consideration of information about a critical pressure drop provided by the control unit via the vehicle bus.

7. The tire pressure monitoring system according to claim 6, wherein the anti-lock braking system is controlled by an electronic stability control system using information provided by the control unit via the vehicle bus.

\* \* \* \* \*